United States Patent [19]

Boontje

[11] 3,865,922

[45] Feb. 11, 1975

[54] PROCESS FOR THE PREPARATION OF CRYSTALLINE CALCIUM SULPHATE AND PHOSPHORIC ACID

[75] Inventor: Jan Th. Boontje, Santpoort, Netherlands

[73] Assignee: Verenigde Kunstmestfabrieken Mekog-Albatros N.V., Utrecht, Netherlands

[22] Filed: Apr. 25, 1972

[21] Appl. No.: 247,415

Related U.S. Application Data

[63] Continuation-in-part of Ser. No. 889,097, Dec. 30, 1969, abandoned.

[30] Foreign Application Priority Data

| Jan. 8, 1970 | Australia | 10132/70 |
| Jan. 8, 1970 | Austria | 142/70 |
| Jan. 8, 1970 | Belgium | 83652 |
| Jan. 10, 1969 | Netherlands | 6900394 |

[52] U.S. Cl. ............... 423/166, 423/320, 423/659, 23/273 R, 23/295
[51] Int. Cl. ........................ C01b 25/16, C01f 1/00
[58] Field of Search ...................... 423/317–321, 423/167, 166, 659; 23/273 R, 295

[56] References Cited
UNITED STATES PATENTS

| 26,585 | 5/1969 | Suanop | 23/123 |
| 2,219,776 | 10/1940 | Henderson | 23/1 R |
| 2,710,247 | 6/1955 | Knowles | 23/122 X |
| 2,926,182 | 2/1960 | Sutton | 23/1 R |

OTHER PUBLICATIONS

J. H. Perry, "Chemical Engineers' Handbook," 4th ed., p. 30.

*Primary Examiner*—O. R. Vertiz
*Assistant Examiner*—Gregory A. Heller

[57] ABSTRACT

Chemical reactions between ions yielding crystalline precipitates are carried out in a rotating disc contactor (RDC), in which an upward current is maintained which provides for a classification of the crystalline product, the coarsest fraction of which is removed at the bottom. In the preparation of phosphoric acid and crystalline calcium sulphate hemihydrate, sulphuric acid and an aqueous solution containing calcium ions and phosphate ions are introduced into an RDC. Said aqueous solution is obtained from part of the phosphoric acid leaving the RDC at its top by dissolving therein crude tricalcium phosphate.

7 Claims, 7 Drawing Figures

PROCESS FOR THE PREPARATION OF CRYSTALLINE CALCIUM SULPHATE AND PHOSPHORIC ACID

Related Applications:

This application is a continuation-in-part of Ser. No. 889,097, filed on Dec. 30, 1969, and now abandoned.

The invention relates to a process for the preparation of chemical products in which process liquids are mixed, thereby yielding one single liquid phase and in which as a consequence of said mixing a reaction between ions is taking place, resulting in a crystalline precipitate.

It is an object of the present invention to prepare crystalline products, consisting of coarse granules by reaction between ions.

It is a further object of the present invention to prepare crystalline products of substantially uniform grain size.

It is a still further object of the present invention to classify the crystalline precipitate obtained according to particle size.

It is also an object of the invention to provide for an easy and effective washing the crystalline precipitate.

Also an object of the invention is an improved process for the preparation of phosphoric acid and gypsum.

An object of the present invention is also an improved process for the preparation of alkali metal silicofluoride from silicofluoric acid and water-soluble alkali metal salts.

A further object of the present invention is an improved process for the preparation of potassium sulphate from potassium chloride and magnesium sulphate.

A still further object of the invention is an improved process for the manufacture of potassium sulphate from kainite ($K_2SO_4 \cdot MgSO_4 \cdot MgCl_2 \cdot 6H_2O$).

More objects of the invention will be apparent as this description proceeds.

According to the invention use is made of an apparatus which is known as Rotating Disc Contactor (RDC). Essentially an RDC consists of a vertical cylindrical tube, the internal space of which is divided into compartments by stator rings, i.e., baffles or partitions with a central opening, and in which a stirring device is present consisting of a vertical shaft extending through said central openings on which shaft horizontal discs, so-called rotor discs, are mounted. Usually the stator rings are substantially flat and have two substantially horizontal surfaces. Usually a rotor disc is present in every compartment about at half its height. For constructionsl reasons an apparatus is preferred in which the diameter of the rotor discs is smaller than the inner diameter of the stator rings. The number of compartments in an RDC is usually at least 3.

The rotating disc contactor can also be described as a body of liquid in the shape of a cylinder with a vertical axis and consisting of a plurality of alternating cylindrical sections A and B, in vertical succession, each section A being at its bottom axially connected with the liquid thereunder and at its top peripherically connected with the section of liquid above, shearing forces being exerted tangentially on the top of each section of liquid A, increasing from the axis to the peripherical connection with the adjacent section of liquid, each section B being at the top axially connected with the liquid above and at its bottom peripherically connected with the section of liquid thereunder, tangential shearing forces being exerted at the bottom of each section of liquid B increasing from the axis to the peripherical connection with the adjacent section of liquid thereunder, said shearing forces provoking movement of liquid in each section. Usually the sections are cylindrical units limited by horizontal planes at the top and the bottom.

The general principle of construction and operation and the vortex patterns created by the baffles of an RDC are disclosed in U.S. Pat. No. 2,601,674, and will not be described in detail herein.

As more completely set forth in the cited patent the rotation of a rotor disc results in a shearing force to be exerted upon the liquid in contact with the disc. The magnitude of the shearing force is dependent upon the speed of revolution of the rotor disc and it is increasing from the center towards the periphery. The shearing force causes the liquid near the disc to move centrifugally. The centrifugal currents hit the cylindrical wall of the compartment and are deflected upward and downward to meet the stator rings. The currents are then further deflected by the stator rings to continue their way centripetally. The result is a toroidal current pattern in every section or unit of liquid, in other words two toroidal current patterns in every compartment one above the rotor disc in the compartment, the other under the rotor disc in the compartment.

The invention can be characterized as relating to a process for the preparation of chemical products, in which process liquids are mixed under formation of one single liquid phase and in which as a result of said mixing a reaction between ions is taking place, yielding a crystalline precipitate the mixing being effected in an RDC in which an ascending current is maintained, so that coarser fractions of the crystals sink down whereas finer fractions are lifted. More exactly the invention can be characterized as relating to a process and apparatus for the preparation of chemical products by chemical reaction between two reactive ingredients in one single liquid phase in which process two different liquids, each containing one of said reactive ingredients in ionized state, are introduced at different points into a body of liquid in the shape of a cylinder with a vertical axis and consisting of a plurality of alternating cylindrical sections A and B in vertical succession, the number of sections A as well as the number of sections B being at least 3, each section A being at its bottom axially connected with the liquid thereunder and at its top peripherically connected with the section of liquid above, shearing forces being exerted tangentially on the top of each section of liquid A, increasing from the axis to the peripherical connection with the adjacent section of liquid above, each section B being at the top axially connected with the liquid above and at its bottom peripherically connected with the section of liquid thereunder, tangential shearing forces being exerted at the bottom of each section of liquid B increasing from the axis to the peripherical connection with the adjacent section of liquid thereunder, said shearing forces provoking movement of liquid in each section, the liquids introduced being mixed with the said body of liquid yielding thereby one single liquid phase, said mixing resulting in a reaction between the ions introduced, said reaction resulting in a crystalline precipitate, the introduction of liquids into said body of liquid causing in said body of liquid an upward displacement of liquid, said upward displacement of liquid causing fine crystals of the precipitate to rise through connections between successive sections A and B, such in contradistinction to crystals that have grown so much that their sinking velocity exceeds the speed of the upward current in said connections, removal at the top of said body of liquid of a portion of liquid as displaced by the introduction of liquids into said body of liquid, and withdrawal of the crystalline precipitate at the bottom of said body of liquid.

Figure 1:
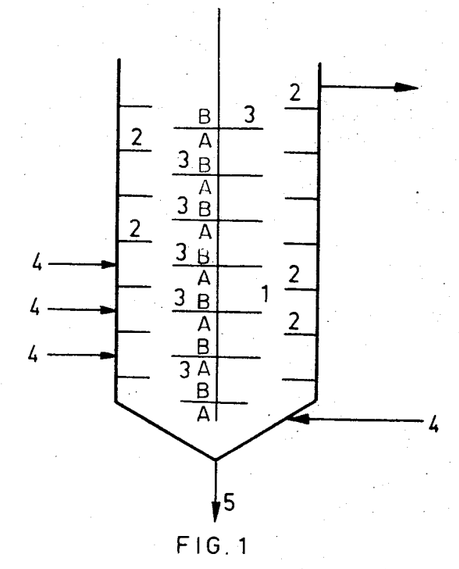

In FIG. 1, a schematized vertical sectional view (as are also FIGS. 2 – 7), 1 is the RDC, in which the crystalline precipitate is to be produced and in which the stator rings 2 and the stirring device 3 are present. The liquids which are to be mixed in the RDC, are supplied through inlet orifices 4 in the wall, at least one for each liquid introduced. Each of the liquids on being introduced through the orifices located at different points is immediately and separately diluted with the stirred liquid mixture in the RDC. In this way local excess of reactive ingredients, local supersaturation with respect to the reaction product and excessive nuclei formation are avoided. Also it may be advantageous to divide the supply of the liquids over several orifices applied in the wall at various heights.

The velocity of the ascending current in the RDC (that is the net vertical liquid displacement in the RDC) can be controlled by suitably adjusting the supply of the liquids. Dependent on the velocity of the ascending current and the height of the RDC is the duration of residence of the mixture in the RDC which must be adapted to the speed at which the crystals are forming and growing.

Small crystals are lifted by the ascending current. Whilst moving upwards the crystals grow, so that they are following the ascending current less and less, and finally sink contrary to the ascending stream of liquid. Settling matter is collected at the bottom of the RDC and can be removed through orifice 5.

The liquids which are introduced into the RDC in accordance with the invention are usually solutions of ionized compounds in water. Usually in this process ions supplied by different solutions react with each other. It is also possible, however, that a solution in which an ionized compound is present, is mixed in the RDC with a liquid which is different from the solvent of the said solution, but miscible therewith and which is counteracting the ionization of said compound, so that the compound precipitates.

The liquid (mother lye) which leaves the RDC at the top can be used entirely or partially for dissolving initial materials after which the liquid is re-introduced into the RDC at a lower level.

Usually the liquid having passed in upward direction through the highest situated stator ring still contains fine crystals. In order to separate these fine crystals from the liquid, the liquid can be passed into a settling zone, not shown in FIG. 1, i.e., a space in which the ascending current is slower than in the RDC and in which space no or hardly any stirring is effected. This settling zone may be provided within an extension of the cylindrical wall of the RDC beyond and above the highest situated stator ring. The cylindrical wall may be widened here. The velocity of the ascending current in said settling zone can also be decreased, however, by removing part of the liquid (mother lye) at the top of the RDC through a side stream and causing only the rest of that liquid to enter into said settling zone. It is advantageous to use the liquid removed through said side stream partially or entirely for the preparation of the initial solution or initial solutions, and to recirculate it into the RDC; the finer crystals of precipitate having remained in the circulating liquid in this case can act as nuclei, i.e., seed crystals in the RDC.

Figure 2:
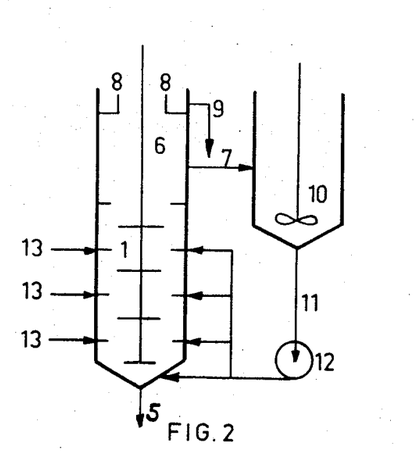

In FIG. 2, 1 is the RDC in which the crystalline precipitate is formed. At the top of this RDC a settling zone 6 is provided in which no stator rings and rotor discs are present. At the bottom of settling zone 6 part of the mother lye in which fine crystals are still present is removed through line 7. If RDC 1 and settling zone 6 are equal in diameter the upward displacement of liquid in settling zone 6 is less than in RDC 1, only as a result of the removal of liquid through line 7. Mother lye which is free or nearly free from crystals, is removed at the top of settling zone 6. Suitable for the removal at the top of settling zone 6 is a overflow channel 8 with discharge line 9.

The liquid which is removed through line 7 can be used in vessel 10 for dissolving initial material. The solution is transported to RDC 1 through line 11 with pump 12. For the dissolving of initial material the liquid from line 7 may be replaced, of course, entirely or partially by the liquid from line 9. The solution which is transported through line 11 to RDC 1 reacts in RDC 1 with another initial material, which is introduced through lines 13.

Figure 3:
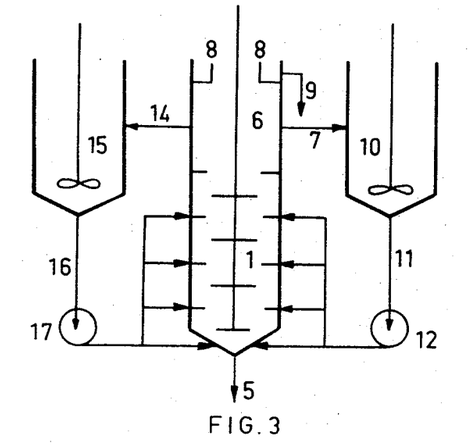

If the initial material consists of two substances, for instance two salts which must be dissolved separately and then introduced into the RDC, the scheme of FIG. 3 applies. At the top of RDC 1 liquid is discharged through line 7 to vessel 10 as well as through line 14 to vessel 15. In the vessels 10 and 15 the various initial materials are dissolved. The solutions obtained are re-introduced into the RDC 1 through line 11 with pump 12 and through line 16 with pump 17 respectively.

The velocity of the ascending current in RDC 1 may be regulated by means of the supplying pumps (12 in FIG. 2, 12 and 17 in FIG. 3). In this way also the crystal size in the product is controlled. Besides the concentration of the crystals in the RDC may be maintained between suitable limits. By maintenance of the high concentration of crystals the super-saturation of the crystallizing matter may remain low, so that the growing of the existing crystals is dominating strongly with respect to the formation of nuclei.

The sizes of the crystals which are removed are mostly between 0.05 and 0.5 mm. The content of solid material at the bottom in the RDC of the type represented in FIGS. 1, 2 and 3, is usually between 5 and 20 vol. percent. At a rate of settling of 1 to 2 cm/sec. an RDC of 1m diameter may have a production of the order of magnitude of 10,000 to 20,000 kg crystal per hour.

The coarsely crystalline product which is removed from the RDC at the bottom may be separated from mother lye attached to it in a second RDC. The second RDC can be connected with the first by a line, but it is preferred to arrange the second RDC underneath the first and unite the two RDC's to one apparatus. In that case the rotor discs of both RDC's can be mounted on one single shaft. If desired, the rotor discs of the two RDC's may be mounted, however, on separate shafts, so that the speed of rotation in either RDC may be adapted separately as conditions require. Both shafts can be mounted concentrically. The velocities of the ascending current need not be equal in both RDC's. In the second RDC, for instance, a much lower velocity may be applied than in the first. In the RDC in which the ascending current must effect classification of the crystals a higher velocity is wanted than in the RDC in which washing by means of the ascending current is aimed at. The diameters of both RDC's need not be equal either. Suitable for concentrating and effectively washing out of the crystalline product is a second RDC of a diameter smaller than that of the first RDC.

Figure 4:
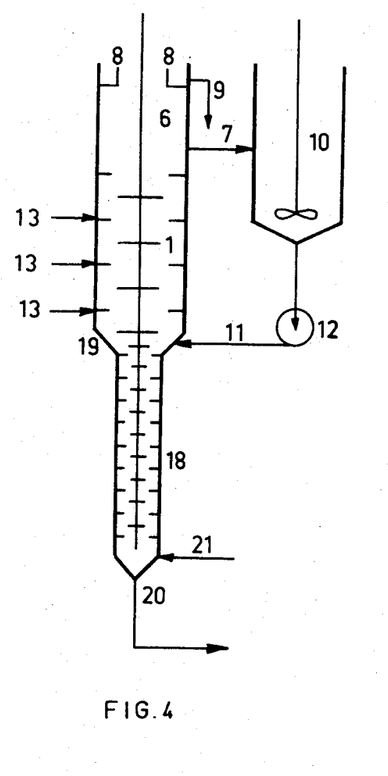

The second RDC which is used for washing the crystals is shown in FIG. 4 at 18. The RDC's 1 and 18 are connected by a frusto conically tapering intermediate tube 19. At the bottom of the RDC 18 a discharge orifice 20 is present. Washing liquid can be introduced through line 21 connecting with RDC 18 closely to the bottom thereof.

As said before, one of the most important applications of the invention is the application in the conversion of crude phosphates with sulphuric acid into phosphoric acid and gypsum.

As is well known, the said conversion is effected at temperatures of about 90°–110°C. in order to obtain phosphoric acid of high concentration; the calcium sulphate is obtained in that case as hemihydrate. It is also known that this hemihydrate is in better conditions for being filtrated if the crude phosphate is first dissolved in phosphoric acid obtained previously and sulphuric acid is added subsequently. The hemihydrate obtained under such conditions still contains $P_2O_5$, which is removed by recrystallization of the hemihydrate to dihydrate.

In accordance with the invention the conversion of crude phosphates with sulphuric acid is carried out in apparatus as represented in FIG. 2 or 4. In the RDC 1 a solution containing calcium and phosphate ions is introduced through line 11 with pump 12. Through lines 13 sulphuric acid is introduced. In RDC 1 a reaction between calcium and sulphate ions results. Always a quantity of calcium sulphate hemihydrate is present. Freshly formed hemihydrate crystallizes on the existing crystal surfaces, so that the crystals grow. Fine crystals of hemihydrate are lifted initially with the ascending current, but many of these crystals after having grown sufficiently start to sink. The most favourable conditions are obtained at a solid content of the liquid at the bottom of RDC 1 between 10 and 20 vol.%, for instance 15 vol.%, i.e., 400 grans of solid per litre. Crystals attaining space 6 start to sink therein as a result of the velocity of the ascending liquid in that space being smaller. At 8 a clear solution of phosphoric acid is discharged. This phosphoric acid may serve for the dissolving of crude phosphate, but preferably for this purpose use is made of a liquid which leaves the RDC through line 7, which liquid still contains fine crystals of hemihydrate. The dissolution of crude phosphate in the phosphoric acid is carried out in vessel 10 with stirring device. Suitable temperatures for this dissolving process are between 80° and 115°C., particularly between 95° and 110°C. An amount of phosphoric acid sufficient for the dissolution of the entire intake of crude phosphate, must circulate.

One can infer from the relevant phase diagrams that phosphoric acid of 30% $P_2O_5$ dissolves 5% CaO, phosphoric acid of 40% $P_2O_5$, about 4% of CaO and phosphoric acid of 50%, about 3% CaO. The solution obtained, which contains calcium ions and phosphate ions and also fine crystals of hemihydrate, is transported to the RDC through line 11 with pump 12. The recirculated fine crystals of hemihydrate act as seed crystals in the RDC.

The crystals leaving RDC 1 at 5 are coarse and uniform in size and also very pure. This product is easily washed and concentrated.

The washing of the hemihydrate may be carried out in the second RDC 18 in an ascending current of water or dilute sulphuric acid. Filtration of the hemihydrate which in known processes is a cumbersome intermediate step, is dispensed with in the present process. Taking into account the composition of the liquid the temperature in RDC 18 is maintained at such a level that no dihydrate is formed.

By recrystallization of hemihydrate to dihydrate in a subsequent step the product may be freed from $P_2O_5$. The recrystallization is carried out in a solution preferably containing a considerable amount of free sulphuric acid and usually also phosphoric acid (for instance 2 to 25% by weight of $H_2SO_4$ and 0 to 20% by weight of $P_2O_5$). In this recrystallization process as is well known the temperature should be under a limit which depends on the composition of the liquid. Said limit is mostly under 80°C.

The dihydrate which is prepared from the hemihydrate obtained according to the present invention is crystallizing in a medium which is rather pure and, therefore, it is coarse as well and easily filtrated and washed. The mother lye remaining after the recrystallization of hemihydrate to dihydrate may advantageously be introduced into the second RDC at the bottom to serve as a washing liquid. If desired, more sulphuric acid may be added in high concentration to the last-mentioned mother lye, in order to increase the temperature in the second RDC. This may be important to prevent premature crystallizing of dihydrate in the line.

The process described yields phosphoric acids of any desired concentration up to 55% by weight of $P_2O_5$ without evaporation of water being necessary. The gypsum obtained can be used in wet condition without further purification for the preparation of first quality plaster and also for conversion into ammonium sulphate and calcium carbonate. After drying and calcining it may be applied as admixture to cement and for the preparation of cement clinker and sulphuric acid.

A second very attractive application of the invention is found in the preparation of sodium silicofluoride according to the equation:

NaCl is dissolved in vessel 10 in mother lye previously obtained in this process (FIGS. 2 and 4) and reacts with $H_2SiF_6$ in RDC 1, the $H_2SiF_6$ being introduced through lines 13. $Na_2SiF_6$ crystallizes in RDC 1 and is discharged from RDC 1 through orifice 5 (FIG. 2) or through the tapering tube 19 (FIG. 4). Mother lye still containing fine crystals of $Na_2SiF_6$ is flowing through line 7 to vessel 10. Dilute hydrochloric acid which may contain the excess of NaCl applied, if any, is discharged in FIGS. 2–4 at 9. It may be desired to dilute the solution of $H_2SiF_6$ which is introduced into RDC 1 previously with water. This may be done by adding this solution to circulating mother lye in vessel 15 (FIG. 3) or alternatively by mixing this solution with the washing liquid at about half the height in RDC 18, which is intended for washing (FIG. 4). The diameter of RDC 18 may be adapted to the introduction of liquid at half its height, i.e., the diameter may be larger above the point of introduction than underneath. This situation is shown in more detail in FIG. 7 to which Example II herein further relates.

$K_2SiF_6$ may be prepared in an analogous way.

As a third application of the invention the application in the so-called Somet-process may be mentioned. (Sondershausen Methanol process, H. Hoppe, "A new method for the production of chlorine-free potash fertilizers," Proc. of the XVIIth International Congress "Chemistry Days 1966" on Chemical Fertilizers, Milan, pp. 121 – 132). In this process potassium sulphate is prepared by conversion of KCl with $MgSO_4$ in water in two reaction steps:

In the last step methanol is added to the solution to decrease the solubility of $K_2SO_4$. Instead of methanol also ethanol, dioxan, acetone and other organic liquids may be used.

According to the present invention use can be made of equipment as presented in FIG. 4 in either step of the Somet process. The combination of both steps in such apparatus is schematically presented in FIG. 5. In the first step RDC 51 is used, from which at the top mother lye is discharged through lines 57 and 64. Line 57 leads to vessel 60, in which KCl is dissolved. The solution obtained in vessel 60 is introduced into RDC 51 through line 61 with pump 62. Line 64 leads to vessel 65, in which $MgSO_4 \cdot 6H_2O$ is dissolved. The solution obtained here is transported to RDC 51 through line 66 with pump 67. From RDC 51 crystalline schoenite ($K_2SO_4 \cdot MgSO_4 \cdot 6H_2O$) sinks into RDC 68 and is washed therein with a mother lye containing an organic liquid, for instance methanol, which mother lye is obtained in the second step of the process. This mother lye is introduced into RDC 68 through line 71.

Figure 5:
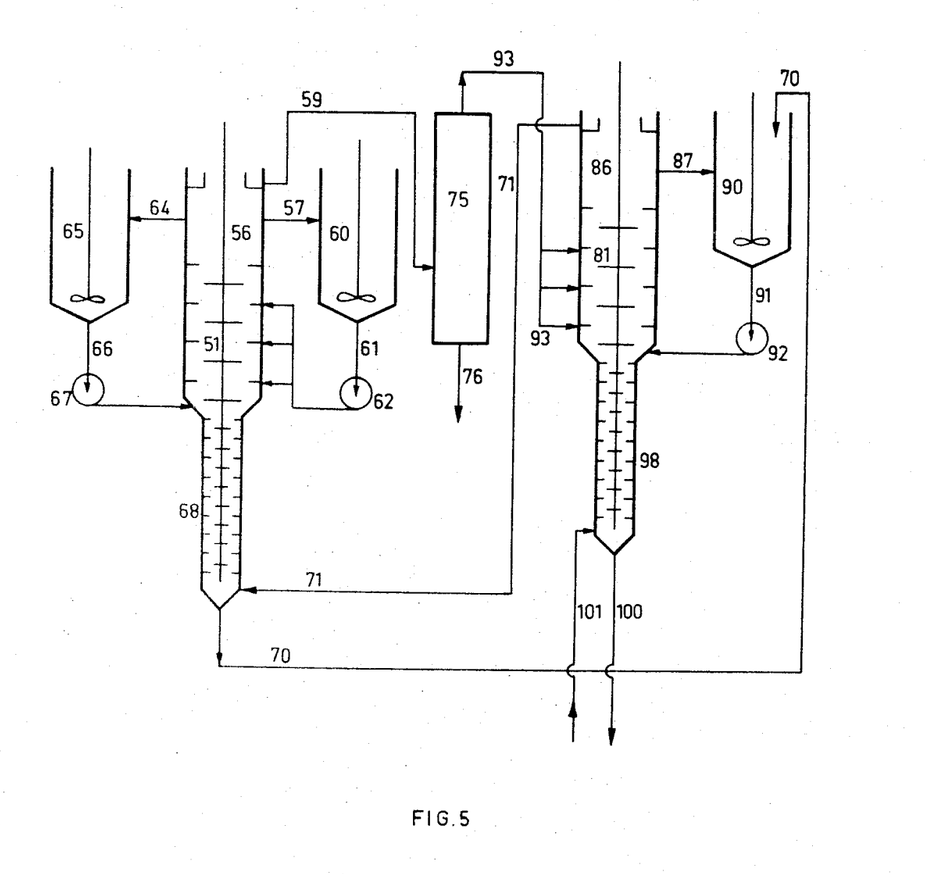

A schoenite suspension is transported from RDC 68 through line 70 to vessel 90, in which also KCl and (through line 87) a mother lye discharged from the top of RDC 81 are introduced. The solution obtained in vessel 90 at increased temperature (for instante 50°– 90°C.) is transported through line 91 with pump 92 to the bottom of RDC 81, in which also the organic liquid, for instance methanol, is introduced through lines 93. As a result of the presence of methanol $K_2SO_4$ crystallizes and sinks down to RDC 98 in which washing water ascends introduced through line 101. $K_2SO_4$ is removed as a product through line 100.

At the top of RDC 81 space 86 is present devoid of stator rings and rotor discs and in which fine crystals of $K_2SO_4$ may sink. From space 86 mother lye flows over into line 71, leading to RDC 68. At the top of RDC 51 space 56 is present devoid of stator rings and rotor discs and in which fine crystals of schoenite may sink. From space 56 mother lye containing methanol flows over into line 59 leading to the distillation column 75. From the distillation column 75 a mother lye free from methanol and besides water containing mainly $MgCl_2$ is discharged through line 76. Concentrated methanol (for instance 85 – 90 percent by weight) is discharged from column 75 through line 93 leading to RDC 81.

It is evident that by the application of the invention in this conversion process a considerable simplification is achieved, since various filters and storing tanks are dispensed with.

A fourth application of the invention is in another known process also for the preparation of $K_2SO_4$ (L. Cavalli and M. Maggiore, Industrial and technical aspects of the recovery of potash by means of syngenite. Proceedings of the XVIIth International Congress "Chemistry Days 1966" on Chemical Fertilizers, Milan, pp. 171 – 177). In this process kainite ($K_2SO_4 \cdot MgSO_4 \cdot MgCl_2 \cdot 6H_2O$) is first converted into schoenite by treating it with a mother lye obtained elsewhere in the process. The schoenite is separated off and extracted with a warm solution of $K_2SO_4$ in water, so that crystalline $K_2SO_4$ is obtained and the mother lye just mentioned is remaining, which after cooling is contacted with kainite. After being separated from the schoenite the liquid still contains about 30 percent of the potassium present in the initial kainite. In order to recover the last-mentioned potassium gypsum (dihydrate) is added which causes syngenite ($CaSO_4 \cdot K_2SO_4 \cdot H_2O$) to crystallize. From the syngenite after separating it off, a solution of $K_2SO_4$ may be obtained by extraction with hot water. This last solution serves for the extraction of the schoenite. The various steps constituting this process including the extraction and the washing of crystals can advantageously be carried out in accordance with the present invention.

As further examples of processes in which a separation is obtained by crystallization and the invention may be advantageously applied, may be mentioned:

- Manufacture of pigments with aftertreatment of precipitates.
- Preparation of $(NH_4)_2SO_4$ from gypsum, $NH_3$ and $CO_2$, in which $CaCO_3$ is wanted in coarsely crystalline condition for being easily washed out and separated off.
- The preparation of mono-ammonium phosphate from crude phosphoric acid and ammonia, in which process often hardly filterable and washable precipitates of complex iron and aluminum phosphates are produced. The RDC is very suitable to agglomerage such precipitates as a result of which they obtain a sufficient velocity of settling, so that they can be washed in countercurrent. The washing is of great practical importance in view of preparation of other pure phosphates (for instance sodium phosphate and sodium polyphosphate) from the ammonium phosphate.

- Preparation of $NH_4F$ from a solution of $H_2SiF_6$ and $NH_3$ with $DiO_2$ precipitating.

The number of compartments in an RDC (one compartment containing one unit of liquid body A and one unit of liquid body B as defined hereinbefore) is usually between 3 and 25. The relative preparation of height to diameter of a compartment is usually between 1:1 and 1:10, preferably between 1:2 and 1:5. The relative proportion of diameter of rotor discs and internal diameter of the RDC is usually between 2:10 and 9:10. The relative proportion of internal diameter of stator rings and RDC is usually between 2:10 and 9:10. The number of rotations of the shaft or shafts is usually between 50 and 2000 per minute. If the apparatus consists of two or three RDC's of different diameter in vertical succession, the internal diameter of the widest RDC may be for instance between 2 and 5 times the internal diameter of the narrowest RDC.

EXAMPLE I

Figures 6, 7:
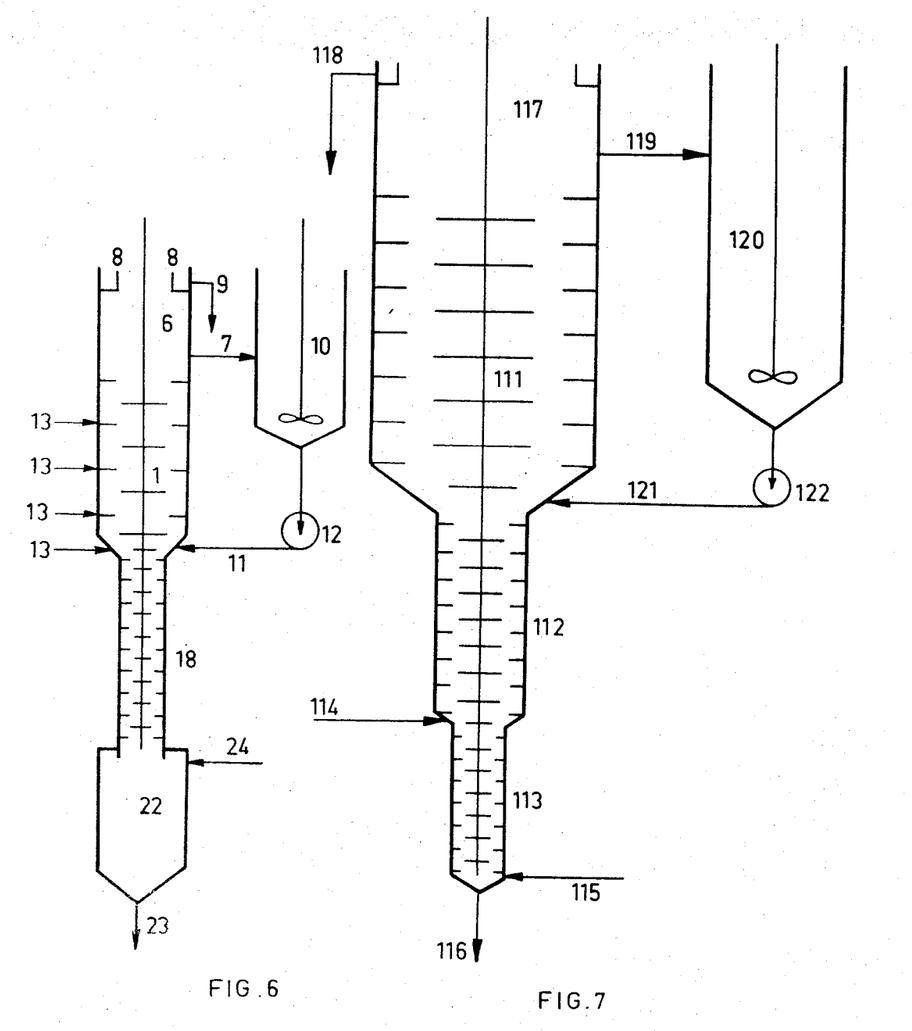

Conversion of Kola phosphate with sulphuric acid into phosphoric acid and calcium sulphate hemihydrate As an initial material Kola phosphate with 50 percent by weight of CaO and 35 percent by weight of $P_2O_5$ was used. 20 kg of this Kola phosphate were converted every hour for which 17 ½ kg $H_2SO_4$ were necessary. Use was made of an apparatus as shown in FIG. 6; this is similar to the apparatus of FIG. 4, with the exception that RDC 18 is connected at the bottom with a thickener 22, i.e., a space in which the suspended hemihydrate was concentrated. The concentrated suspension (30 percent by weight hemihydrate, 70 percent by weight liquid) leaves the thickener 22 through line 23. Line 23 leads to an apparatus (not shown) in which the hemihydrate is recrystallized to dihydrate. From the last-mentioned apparatus a stream of liquid flows back which is introduced into thickener 22 through line 24.

Water, sulphuric acid and phosphoric acid in quantities equal to these that are discharged with the suspension through line 23, are reintroduced through line 24 into thickener 22. Also an extra quantity of water is introduced into thickener 22 which is equal to the consumption of water. The water consumed is the quantity of water leaving the process as a diluting component of the phosphoric acid and as crystal water in the hemihydrate. From this amount the quantity of water introduced into the process with the sulphuric acid (with 98 percent sulphuric acids 2 percent water) should be subtracted. The extra quantity of water introduced through line 24 may be used previously for washing the dihydrate when this is separated off by filtration or centrifugation.

Also part of the amount of sulphuric acid necessary for the conversion can be added through line 24. The rest of the sulphuric acid is supplied through lines 13.

In the table hereunder data of experiments leading to phosphoric acid of two concentrations either pure or containing some sulphuric acid are collected.

The liquid at the bottom of RDC 18 in any case contained 10 percent by weight of $P_2O_5$ and 15 percent by weight of $H_2SO_4$. The temperature in vessel 10 was 105°C., in RDC 1 105°C., in RDC 18 on the average 85°C.

TABLE I

|  | A | B | C | D |
|---|---|---|---|---|
| $P_2O_5$ in phosphoric acid produced)%wt calculated on $H_3PO_4+H_2O$ | 40 | 40 | 50 | 50 |
| $H_2SO_4$ in phosphoric acid produced)%wt calculated on $H_3PO_4+H_2O$ | 0 | 2 | 0 | 2 |
| Consumption of water, kg/h | 9.45 | 9.45 | 5.95 | 5.95 |
| Quantity of $H_2SO_4$ supplied through lines 13, kg/h | 15.14 | 15.49 | 16.12 | 16.40 |
| Quantity of $H_2SO_4$ supplied through line 24, kg/h | 2.36 | 2.36 | 1.38 | 1.38 |
| Quantity of CaO that dissolves in acid in vessel 10 together with quantity of CaO that is converted into $CaSO_4$ in vessel 10, calculated in %wt on the acid. | 4.0 | 5.14 | 3.0 | 4.14 |
| Quantity of acid to vessel 10, kg/h | 250.0 | 195.0 | 333.0 | 242.0 |
| CaO, dissolved in vessel 10, kg/h | 10.0 | 7.80 | 10.0 | 7.24 |
| CaO, precipitated as hemihydrate in vessel 10, kg/h | 0 | 2.20 | 0 | 2.76 |
| Dimensions of the apparatus |  |  |  |  |
| RDC 1 (length without space 6, cm | 70 | 70 | 70 | 70 |
| (diameter RDC, internally, cm | 25 | 25 | 35 | 35 |
| (number of compartments | 7 | 7 | 10 | 10 |
| (diameter stator rings, internally, cm | 20 | 20 | 28 | 28 |
| (diameter rotor discs, cm | 15 | 15 | 22 | 22 |
| RDC 18 (length, cm | 23 | 23 | 36 | 36 |
| (diameter of RDC, internally, cm | 10 | 10 | 10 | 10 |
| (number of compartments | 7 | 7 | 11 | 11 |
| (diameter stator rings, internally, cm | 7 | 7 | 7 | 7 |
| (diameter rotor discs, cm | 6 | 6 | 6 | 6 |
| Height of space 6, cm | 30 | 30 | 30 | 30 |
| Stirring speed, rotations per minute | 200 | 200 | 200 | 200 |
| Relative proportion of velocities of flow RDC 1/RDC 18 | 3 | 2.3 | 3 | 2.2 |

EXAMPLE II

Preparation of sodiumsiliofluoride (150 kg/h)

The apparatus is schematically represented by FIG. 7. In FIG. 7 111 is an RDC, in which $H_2SiF_6$ is reacted with NaCl. The precipitated $Na_2SiF_6$ sinks down from RDC 111 successively through RDC 112 and RDC 113, which are intended for washing out the $Na_2SiF_6$. Through line 114, 460 kg of 25 percent wt solution of $H_2SiF_6$ in water is supplied at the bottom of RDC 112. 360 kg of washing water are introduced every hour at the bottom of RDC 113 through line 115. The $Na_2SiF_6$ produced is discharged through line 116.

A part of the mother lye ascends from RDC 111 into space 117, which is devoid of rotor discs and stator rings and in which the fine crystals present can sink down. Mother lye that is free from crystals is discharged through line 118 (composition: 345 kg of water from the solution of $H_2SiF_6$, 360 kg of washing water, 58 kg HCl, 16 kg of NaCl, together 779 kg. specific weight 1.15).

Mother lye (1,530 litre per hour), that still contains fine crystalline $Na_2SiF_6$ leaves RDC 111 at the top through line 119 to stirred vessel 120, in which also 110 kg of NaCl is dissolved every hour, leaves vessel 120 at the bottom and is transported by line 121 with pump 122 to the bottom of RDC 111.

The concentrated solution of $H_2SiF_6$ in this Example is diluted with washing water in order to avoid high concentrations of the $SiF_6$-ion; to this end the solution was introduced into the apparatus at a point at which the concentration of sodium ions had decreased already so far that at that spot no $Na_2SiF_6$ could precipitate. The speed of stirring in all RDC's amounted to 120 rpm.

TABLE II

| Dimensions (cm) | RDC 111 | RDC 112 | RDC 113 | Vessel 117 |
| --- | --- | --- | --- | --- |
| Diameter of RDC (internally) | 90 | 40 | 25 | 90 |
| Diameter of stator rings (internally) | 63 | 28 | 17.5 | — |
| Diameter of rotor discs | 40 | 20 | 13 | — |
| Length of column | 140 | 87.5 | 70 | 50 |
| Number of compartments | 7 | 7 | 7 | — |

I claim as my invention:

1. A process for the preparation of calcium sulphate hemihydrate and phosphoric acid by chemical reaction between sulphuric acid and an aqueous solution containing calcium ions and phosphate ions, in which process sulphuric acid and an aqueous solution containing the calcium ions and phosphate ions are introduced into a body of liquid consisting of a suspension of calcium sulphate hemihydrate in a mixture consisting substantially of phosphoric acid and water, said body of liquid being in the shape of a cylinder with a vertical axis and consisting of a plurality alternating cylindrical sections A and B in vertical succession, the number of section A as well as the number of section B being at least 3, each section A being at its bottom axially connected with the liquid thereunder and at its top peripherically connected with the section of liquid above, shearing forces being exerted tangentially on the top of each section of liquid A, increasing from the axis to the peripherical connection with the adjacent section of liquid above, each section B being at the top axially connected with the liquid above and at its bottom peripherically connected with the section of liquid thereunder, tangential shearing forces being exerted at the bottom of each section of liquid B increasing from the axis to the peripherical connection with the adjacent section of liquid thereunder, said shearing forces provoking movement of liquid in each section, the sulphuric acid and the aqueous solution introduced being mixed with the said body of liquid yielding thereby one single liquid phase, said mixing resulting in a reaction between the sulphuric acid and the calcium ions and phosphate ions introduced so as to form phosphoric acid and a crystalline precipitate of calcium sulphate hemihydrate, the introduction of the sulphuric acid and the aqueous solution into said body of liquid causing in said body of liquid an upward displacement of liquid, said upward displacement of liquid causing fine crystals of the calcium sulphate hemihydrate precipitate to rise through connections between successive sections A and B, such in contradistinction to crystals of said calcium sulphate hemihydrate that have grown so much that their sinking velocity exceeds the speed of the upward current in said connections, removal at the top of said body of liquid of a portion of liquid as displaced by the introduction of the sulphuric acid and the aqueous solution into said body of liquid, and withdrawal of the crystalline precipitate of calcium sulphate hemihydrate at the bottom of said body of liquid.

2. The process according to claim 1, wherein the said aqueous solution containing calcium ions and phosphate ions is prepared by dissolving crude calcium phosphate into part of the phosphoric acid produced which part is withdrawn at such level of said body of liquid that it still contains fine crystals of calcium sulphate hemihydrate.

3. A process for the preparation of calcium sulphate hemihydrate and phosphoric acid by chemical reaction between sulphuric acid and an aqueous solution containing calcium ions and phosphate ions, in which process sulphuric acid and an aqueous solution containing the calcium ions and phosphate ions are introduced at different points into a body of liquid comprising a suspension of calcium sulphate hemihydrate in a mixture consisting substantially of phosphoric acid and water, said body of liquid being in the shape of a cylinder with a vertical axis and consisting of a plurality of alternating cylindrical sections A and B in vertical succession, the number of sections A as well as the number of sections B being at least 3, each section A being at its bottom axially connected with the liquid thereunder and at its top peripherically connected with the section of liquid above, shearing forces being exerted tangentially on the top of each section of liquid A, increasing from the axis to the peripherical connection with the adjacent section of liquid above, each section B being at the top axially connected with the liquid above and at its bottom peripherically connected with the section of liquid thereunder, tangential shearing forces being exerted at the bottom of each section of liquid B increasing from the axis to the peripherical connection with the adjacent section of liquid thereunder, said shearing forces provoking toroidal movement of liquid in each section, the sulphuric acid and the aqueous solution introduced being mixed with the said body of liquid yielding thereby one single liquid, said mixing resulting in a reaction between the sulphuric acid and the calcium ions and phosphate ions introduced, so as to form phosphoric acid and a crystalline precipitate of calcium sulphate hemihydrate, the introduction of sulphuric acid and the aqueous solution into said body of liquid causing in said body of liquid an upward displacement of liquid, said upward displacement of liquid causing fine crystals of the calcium sulphate hemihydrate precipitate to rise through connections between successive sections A and B, such in contradistinction to crystals of said calcium sulphate hemihydrate that have grown so much that their sinking velocity exceeds the speed of the upward current in said connections, removal at the top of said body of liquid of a portion of liquid as displaced by the introduction of the sulphuric acid and the aqueous solution into said body of liquid, and withdrawal of the crystalline precipitate of calcium sulphate hemihydrate at the bottom of said body of liquid.

4. The process according to claim 2, in which part of the liquid having passed through the highest situated section B of said body of liquid is recirculated for being reintroduced into lower parts of said body of liquid.

5. The process according to claim 4, in which sulphuric acid and/or calcium ions and phosphate ions are dissolved in part of the liquid having passed through the highest situated section B of said body of liquid before said part of said liquid is reintroduced into lower parts of said body of liquid.

6. The process according to claim 1, further comprising the steps of sinking the crystalline precipitate of calcium sulphate hemihydrate leaving said cylindrical body of liquid at its bottom through a second body of liquid in the shape of a cylinder with a vertical axis and consisting of a plurality of alternating cylindrical sections A and B in vertical succession, the number of sections A as well as the number of sections B in said second body of liquid being at least 3, each section A in said second body of liquid being at its bottom axially connected with the liquid thereunder and at its top peripherically connected with the section of liquid above, shearing forces being exerted tangentially on the top of each section of liquid A, increasing from the axis to the peripherical connection with the adjacent section of liquid above, each section B in said second body of liquid being at the top axially connected with the liquid above and at its bottom peripherically connected with the section of liquid thereunder, tangential shearing forces being exerted at the bottom of each section of liquid B increasing from the axis to the peripherical connection with the adjacent section of liquid thereunder, said shearing forces provoking movement of liquid in each section of said second body of liquid, and introducing a washing liquid into said second cylindrical body of liquid at its bottom and causing said washing liquid to flow through all of the sections of said second cylindrical body of liquid in upward succession, so as to wash the sinking precipitate of calcium sulphate hemihydrate, the washing liquid at the top of said second cylindrical body of liquid being introduced into the bottom of the first mentioned cylindrical body of liquid and the precipitate of calcium sulphate hemihydrate being discharged from said second cylindrical body of liquid at the bottom thereof, wherein all liquids introduced in either said first or second body of liquid are aqueous liquids.

7. The process according to claim 6, wherein said second cylindrical body of liquid has a narrower diameter than the first mentioned cylindrical body of liquid.

* * * * *